No. 712,893. Patented Nov. 4, 1902.
J. BALDNER.
COMBINED REVERSING MECHANISM AND BRAKE.
(Application filed Jan. 21, 1901.)
(No Model.) 2 Sheets—Sheet 1.
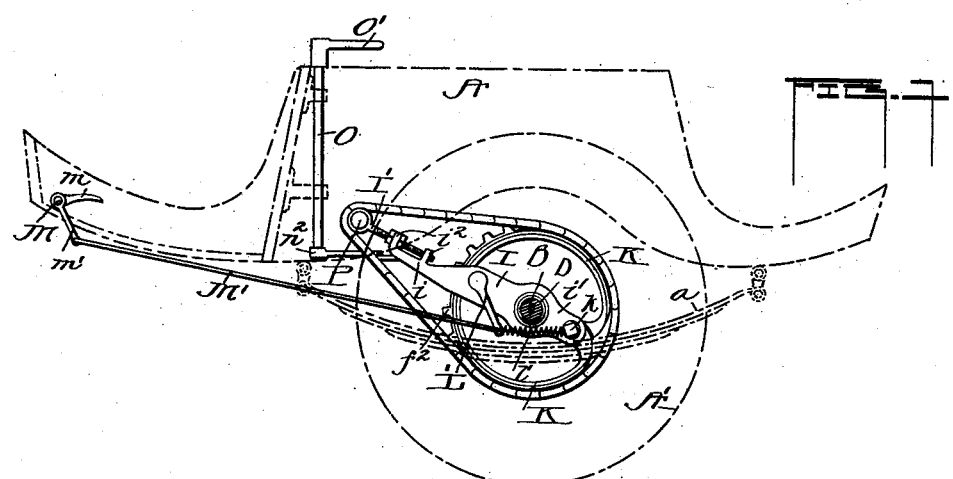
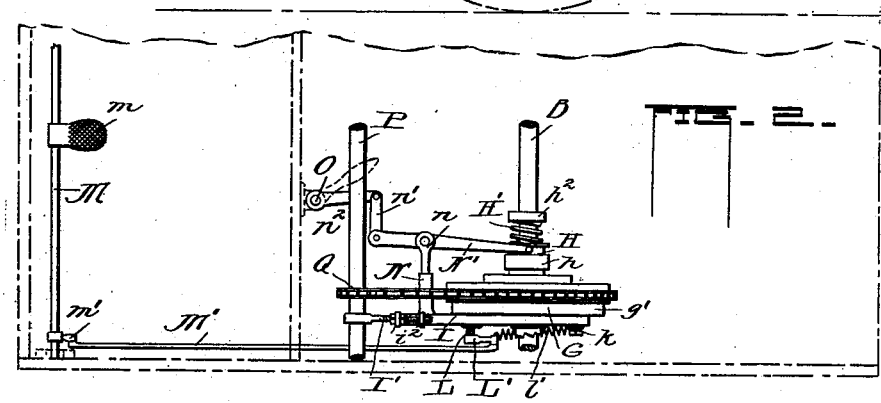
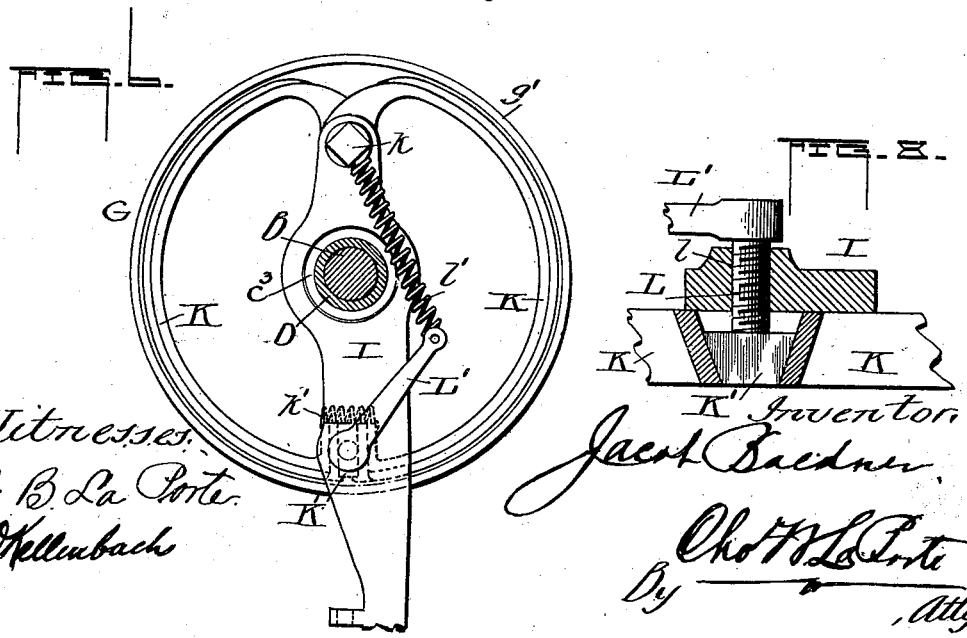
Witnesses:
A. B. La Porte
H. D. Kellenbach
Inventor
Jacob Baldner
By Chas. W. La Porte
Atty.
THE NORRIS PETERS CO., PHOTO-LITHO., WASHINGTON, D. C.

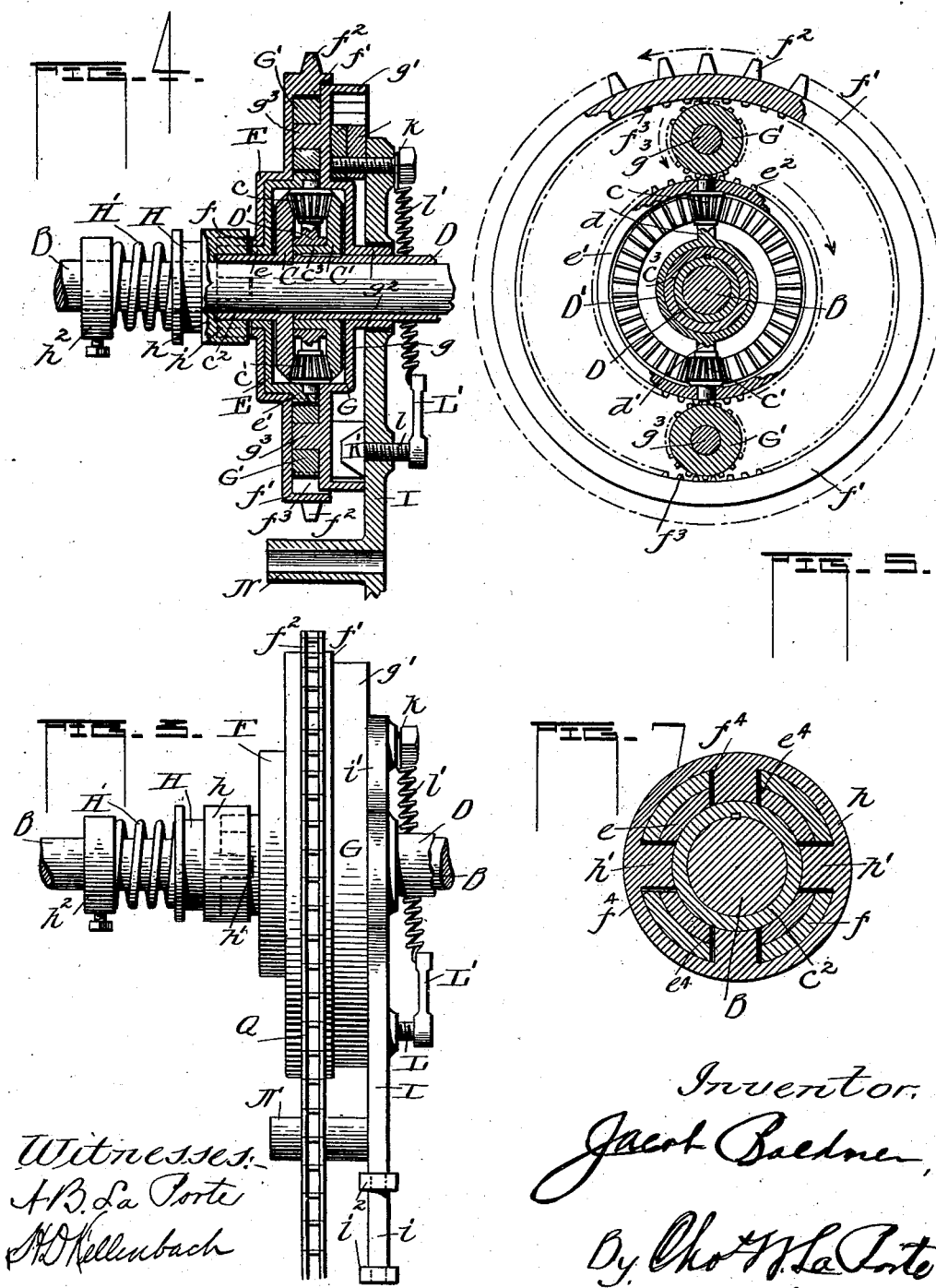

UNITED STATES PATENT OFFICE.

JACOB BALDNER, OF XENIA, OHIO.

COMBINED REVERSING MECHANISM AND BRAKE.

SPECIFICATION forming part of Letters Patent No. 712,893, dated November 4, 1902.

Application filed January 21, 1901. Serial No. 43,996. (No model.)

*To all whom it may concern:*

Be it known that I, JACOB BALDNER, a citizen of the United States, residing at Xenia, in the county of Greene and State of Ohio, have invented certain new and useful Improvements in a Combined Reversing Mechanism and Brake; and I do hereby declare that the following is a full, clear, and exact description of the invention, which will enable others skilled in the art to which it appertains to make and use the same.

My invention has reference to a combined reversing mechanism and brake, applicable more especially to motor-vehicles and designed for attachment to the rear driving-axle thereof, simple and inexpensive in construction, durable, and well adapted for the purpose for which it is designed.

My invention has for its object the provision of suitable mechanism arranged on the driven axle of a motor-vehicle, receiving its motion through suitable sprocket-chain connection with the engine-shaft in the vehicle, of a brake carried in juxtaposition to said mechanism, actuated through suitable means independent of the engine-shaft, and of clutch-operating mechanism for controlling the forward and reverse movements of the driven axle through the mechanism carried thereby.

The invention consists in the combination of parts, their application to the vehicle, and of further details, hereinafter more particularly described in the specification, illustrated in the drawings, and claimed in the appended claims.

In the drawings, Figure 1 is a view in elevation of a portion of a motor-vehicle (shown in dotted lines) with my improvements shown attached thereto. Fig. 2 is a plan view thereof. Fig. 3 is an enlarged plan of the mechanism carried by the axle. Fig. 4 is a longitudinal section showing these parts. Fig. 5 is a vertical cross-section disclosing certain parts. Fig. 6 is an elevation of the parts comprising the brake. Fig. 7 is a cross-section showing the clutch-engaging parts. Fig. 8 is a detail of certain brake parts.

The object I have in view in the present invention is to simplify the reversing and braking mechanism in vogue at the present time on vehicles of the above character and to relieve the power-shaft of the great stress incident to carrying a superfluous number of parts, and to distribute the parts in such a manner as to provide positive means for reversing the vehicle, and a brake mechanism which will be within easy reach of the operator and enable him to have perfect control of the same. As by the provision of means hereinafter pointed out in detail power may be transmitted to the rear axle at a suitable speed to drive the same forward, and the mechanism carried by the said axle may be suitably regulated to reverse the same and the brake applied to retard or stop the movement of the vehicle.

For convenience it will be necessary to describe certain parts upon which I make no claim, but which are a part of every motor-vehicle and are combined herein to show a complete working of the parts.

A illustrates in dotted lines the outline of a suitable vehicle the main body portion of which is supported on wheels A' through the springs $a$, which are best shown in dotted lines, and the axle B, which is shown throughout in full lines. On the axle B, I arrange to carry the essential features of my improvement, and the peculiar arrangement is such as to enable me to carry them in a greatly-reduced space, giving the operator complete control over the action of the driving-axle.

My device comprises a compensating-gear mechanism, which comprises the bevel-gears C and C' and the bevel-pinions $c$ and $c'$. The bevel-gear C has a rear tubular extension or bearing $c^2$ to be keyed or otherwise made positive with the axle B, and the bevel-gear C' has the inwardly-carried tubular extension or bearing $c^3$ to be keyed or otherwise suitably secured to a sleeve D, loosely carried on the axle B, upon which it is purposed to carry one of the driving-wheels, the opposite driving-wheel being carried on the axle proper.

Interposed between the bevel-gears C and C', I have shown an annular ring D', having a bearing relation on the projection or bearing $c^3$, and the same is provided with the short studs or spindles $d$ $d'$, upon which the bevel-pinions $c$ $c'$ are provided.

E is an annular bearing ring or drum provided with the extension or bearing $e$ and has a bearing relation on the bearing $c^2$ of the bevel-gear C, and $e'$ is a flange extension of the drum E, which is provided with the externally-carried ring-gear $e^2$ in a circumferential plane parallel to the axis of the bevel-pinions $c$ and $c'$. This flange extension $e'$ is suitably connected with the studs or spindles $d$ $d'$, which are of such length as to extend beyond the pinions $c$ $c'$ and be suitably secured in the flange $e'$, which forms a bearing therefor.

F is an exteriorly-carried annular ring or drum of the drum E, provided with the extension or bearing $f$, arranged to have a bearing relation on the extension or bearing $e$ of the drum E, and $f'$ is a flange extension of the drum F, carried in the same circumferential plane with the flange $e'$ of the drum E, but of a greatly-increased diameter, and is provided with the interiorly-arranged ring-gear $f^3$ and the exteriorly-carried sprocket-teeth $f^2$, arranged for sprocket-chain connection with the power-shaft.

G is a flanged ring having the body portion $g$ and the outwardly-carried flange $g'$, and $g^2$ is a tubular extension or bearing of the ring, having a bearing relation on the sleeve D and is carried in juxtaposition to the compensating gear and the rings E and F, and from the body portion of the ring G extend studs or spindles $g^3$, on which are carried the pinions G' G', arranged to intermesh with the external gearing $e^2$ of the drum E and the internal ring-gear $f^3$ of the drum F.

H is a clutch member having a sliding relation on the axle B and has the clutch-engaging part $h$, which is provided with a series of inwardly-projecting prongs or lugs $h'$, which are arranged to engage the groove or slotted portions $e^4$ and $f^4$ of the extensions or bearings $e$ and $f$ for a purpose to be described. This clutch part is held under spring tension by the spring H', which is carried on the axle B and interposed between the clutch and the collar $h^2$, which is suitably held as to be adjusted on said axle.

Referring more particularly to the brake mechanism, I is a frame support or reach having a bearing relation on the tubular bearing extension $g^2$ of the flanged ring G and has the forward extension $i$, approaching the power-shaft P and the rear extension $i'$. The forward extension $i$ has a coupling relation with the power-shaft through the threaded coupling-rod I', carried by the power-shaft, and which is connected with the frame support or reach through the lug extensions $i^2$ thereof, provision being made through the threaded rod to enable the reach I to be adjusted toward or from the power-shaft.

K represents semicircular friction-clutch sections pivoted, as at $k$, to one side of the axial center of the axle to the frame-support I, as shown, and approaching each other on the opposite side of the axle are separated or held in their normal position, as shown in Fig. 6, by means of the spacing key or wedge K', the matching ends of the sections being held under tension by means of the spring $k'$.

L represents a suitable threaded stud, to which is attached the lever L' and the spacing key or wedge K'. The threaded stud is arranged to engage the nut $l$, provided at a suitable point in the frame-support I, purposed when the lever L is actuated to cause the stud to be screwed inwardly and at the same time turn and separately deflect the clutch-sections K to cause the same to impinge the flanged rim of the ring G.

$l'$ is a suitable spring secured at $k$ to the frame-support. This insures the wedge remaining in its normal position unlocked, and to lock the same or cause the same to deflect the sections means must be provided which will be described.

M is a suitable rod or spindle arranged to be suitably journaled at a desired point on the forward portion of the vehicle, and $m$ is a foot-lever for actuating said rod.

M' is a rod which is attached at its forward end to the short lever $m'$, carried by the rod M, and at its inner end the same is secured to the outer end, as shown, of the lever L', carried by the frame-support I.

The frame-support is provided with a suitable lateral extension N, which may be tubular in cross-section, if desired, to which is secured the arm extension $n$.

N' is a lever having a pivoted relation with the extension $n$ and has its inner end fulcrumed to engage the clutch H, its outer end having a pivotal connection to the short transverse lever $n'$, which in turn has a pivoted bearing relation with the lever $n^2$, carried by the power-spindle O, which has a vertical bearing relation in the vehicle and journaled in suitable bearings in the seat-body thereof.

O' is an operator's hand lever or handle attached to the spindle O. These parts, as will be seen, with that of the foot-power mechanism for actuating the brake parts, are placed in convenient positions, which enable the operator to have complete control of the parts.

The parts having been assembled, the operation of the device to attain a forward propelling movement of the vehicle or to reverse the same or to set or release the brake parts may be as follows: The power-spindle O, which is secured in the seat proper, carries the lever O', which is arranged conveniently for the use of the operator, may be shifted, causing the clutch-engaging parts on the axle to have a positive connection which will insure the mechanism by means of its connection with the power-shaft when the latter is actuated to impart a forward propelling movement of the driven axle. The clutch as it is shifted will cause the engaging parts to have a positive bearing relation with the annular rings E and F, and when the same are in such a locked position the pinions $g^3$ of the flanged ring G will become locked and the ring will rotate with the rings E and F, and the compensating gear by reason of its connection through the pinions $c$ $c'$ with the ring E will rotate therewith in like manner and cause to be rotated the axle B and the sleeve D, which carry the driven wheels. To actuate the brake parts when they intermesh substantially as has been set forth, (which may be seen in Fig. 4,) the power is turned off of the engine, the foot-lever pressed by the operator's foot, which will reciprocate the rod M', which in turn will cause to be shifted the lever L', which will by its connecting means expand the friction-clutch sections K and cause them to engage the flanged ring G, which will lock the parts from rotation and cause the axle to come to a standstill. To reverse the axle or, rather, the vehicle through the parts carried by the axle B and the sleeve D, the operator will put the brake into a locked position and disengage his clutch parts, and applying power to the ring F in a forward direction by reason of its internal ring-gear intermeshing with the pinions G' and the same having a meshing relation with the external gearing of the annular ring E will reverse the movement of the axle B and the sleeve D through the mechanism of the compensating-gear device, the matching-gears C C' of which have a positive relation with the axle B and the sleeve D.

It is obvious that various changes may be made in the detailed construction of the device and that the location of the same on the axle and the manner of actuating them from the vehicle may be changed without departing from the spirit of the invention herein.

Having thus fully described my invention, what I claim, and desire to secure by Letters Patent of the United States, is—

1. Means for controlling the movements of the propelling-axle of a vehicle, consisting of a sleeve mounted on the axle, a compensating gear, matching gears of which have a positive relation with the axle and the sleeve respectively, concentric rings carried around the compensating gear, a brake carried in juxtaposition to the gear and rings and means for actuating the brake and device for connecting the rings to turn together, substantially for the purpose described.

2. Means for controlling the movements of a propelling-axle of a motor-vehicle, consisting of a compensating gear for imparting movement to the wheels of the axle, concentric rings, gearing carried by said rings, an auxiliary ring carried in juxtaposition to the concentric rings, pinions carried by said auxiliary rings intermeshing with gearing of the concentric rings, each of which coöperate to drive the compensating gear, a brake arranged to engage one of said rings and means carried in connection with the axle arranged to be actuated for imparting movement to the aforesaid devices, substantially in the manner and for the purpose described.

3. Means for controlling the movements of a propelling-axle of a motor-vehicle, consisting of a compensating gear, two concentric rings, a power-shaft, one of said rings having a fixed relation with the gear, and another arranged with sprocket-teeth for sprocket-chain connection with the power-shaft, a flanged ring carried in juxtaposition to the compensating gear and rings, pinions carried thereby, having a meshing relation with the aforesaid rings, and brake mechanism carried in the flanged ring, substantially as described.

4. In a driving mechanism, a main axle through which the propelling force is exerted, a sleeve mounted thereon, wheels carried by the axle and sleeve respectively, a compensating gear having a fixed relation with the axle and sleeve, a pair of concentric rings provided with internal and external gears respectively and having clutch members as shown, a flanged ring carried in juxtaposition to the compensating gear and concentric rings, having a bearing relation on the sleeve, pinions carried by the flanged ring having a meshing relation with the gearing of the concentric rings, a clutch member engaging the clutch parts of the concentric rings, and a brake carried in the flanged ring and mechanism for actuating said clutch and brake parts, substantially as described.

5. In a driving mechanism, a main axle through which propelling force is conveyed to the wheels thereof, a sleeve mounted on the axle, a compensating gear matching gears of which have a positive relation with the axle and the sleeve respectively, a pair of concentric rings, provided with external and internal gears, respectively, one having a bearing on an extension of the gear which is fast to the axle, and the other having a bearing on an extension of the aforesaid ring and each provided with a clutch member, a clutch arranged to engage said clutch members, a flanged ring, carried in juxtaposition to the compensating gear and concentric rings and having a bearing on the sleeve, pinions carried by said flanged ring and arranged to have a meshing relation with the respective external and internal gearing of the concentric rings, semicircular friction-clutch sections in the flanged ring, the mechanism for expanding the sections, a power-spindle in the vehicle and its connection with one of the rings, substantially as described.

6. The means for imparting a forward or reverse movement to the propelling-axle of a vehicle, consisting of a compensating gear, a pair of concentric rings, the exterior ring having sprocket-teeth and an internal ring-gear, the inner ring having external gearing and having connection with the small pinions of the compensating gear, said concentric rings having clutch members, a clutch member shiftable on the axle and arranged to engage the clutch members of the concentric rings, the alternate shifting into or out of engagement of the clutch members of the rings releasing or locking the same for imparting an alternate forward or reverse movement of the compensating gears, a flanged ring, carried in juxtaposition to the compensating gear and concentric rings, pinions carried thereby, a friction-clutch brake carried in the flanged ring and actuated to allow of rotation of the flanged ring with the compensating gear or to hold the same against movements, the means for shifting the clutch parts and the means for actuating the friction-clutch brake, substantially as described.

7. The reversing mechanism, comprising compensating gears C C', and intermeshing gears or pinions $c$ $c'$, drum E, with external gearing $e^3$, the drum F, provided with internal ring-gear $f^3$, and sprocket-teeth $f^2$, the said drums provided with clutch members, a clutch engaging said members, the drum G, pinions G, G' carried thereby intermeshing with the ring-gears $e^2$, and $f^3$, in combination with the driving-axle B, and sleeve D, to which the ground-wheels are attached and means for actuating said mechanism, and a brake mechanism carried by the ring G, all substantially as described.

8. The mechanism for imparting a forward propelling movement to a vehicle, comprising an axle, a sleeve on the axle, a compensating gear having a positive connection with the axle and sleeve, the rings or drums E, and F, contiguous to each other, and each having clutch members the former having external ring-gearing and having connection with said compensating gear, the latter having internal ring-gearing and external sprocket-teeth, a flanged ring and pinions carried thereby, of the slidable clutch member and clutch-operating parts, engaging the clutch members of the drums E and F, all arranged substantially and operated in the manner described.

9. In combination with propelling and reversing mechanism for a driving-axle, a compensating gear, one wheel of which is mounted on the axle and the other mounted on a sleeve carried by the axle, means for locking the independent movement of said gears, the ring or drum G, carried in juxtaposition to said mechanism, friction-clutch sections K, arranged in said ring or drum and the mechanism substantially as shown for expanding said sections to intermittingly engage the interior face of said drum for locking the movement of aforesaid propelling and reversing mechanism, as described.

10. The combination with the compensating gear suitably connected with the driving-wheels of a vehicle, of the drums E, and F, and connections with the compensating gear, said drums having extensions or tubular bearings $e$, and $f$, provided with slotted portions $e^4$, and $f^4$, the clutch member H, having the clutch part $h$, provided with the extensions or prongs $h'$, arranged to engage the slotted portions $e^4$, and $f^4$, of the drums, the power-spindle O, and its connections with said clutch, substantially for the purpose described.

In witness whereof I affix my signature in the presence of two witnesses.

JACOB BALDNER.

Witnesses:
  W. L. MILLER,
  J. F. FLEMING.